(12) United States Patent
Weaver et al.

(10) Patent No.: US 6,343,638 B1
(45) Date of Patent: Feb. 5, 2002

(54) TIRE BELT FOLDING DRUM

(75) Inventors: Douglas Raymond Weaver, Uniontown; Joseph Anthony Farelli, Berlin Center, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/510,779

(22) Filed: Feb. 23, 2000

(51) Int. Cl.⁷ ................................................ B29D 30/38
(52) U.S. Cl. ..................... 156/415; 156/414; 156/421.4
(58) Field of Search ................................... 156/400, 402, 156/421.4, 414–420, 123

(56) References Cited

U.S. PATENT DOCUMENTS

| | | | | |
|---|---|---|---|---|
| 3,887,423 A | * | 6/1975 | Gazuit | 156/402 |
| 4,063,987 A | | 12/1977 | Irie et al. | 156/417 |
| 4,427,473 A | | 1/1984 | Shichman et al. | 156/130 |
| 4,482,416 A | | 11/1984 | Yasukochi et al. | 156/133 |

* cited by examiner

Primary Examiner—Geoffrey L. Knable
(74) Attorney, Agent, or Firm—Frederick K. Lacher; Bruce J. Hendricks

(57) ABSTRACT

Circumferentially spaced folding modules of a tire building drum have axially movable belt lifting and conveying nose pieces which carry wide breaker ply edges over narrow breaker ply edges laid on the drum.

4 Claims, 4 Drawing Sheets

TIRE BELT FOLDING DRUM

TECHNICAL FIELD

This invention relates to a tire breaker folding drum and method where a wide breaker ply is applied to a cylindrical drum with the leading and trailing ends spliced together. Then a narrow breaker ply is wrapped around the wide breaker ply and its ends spliced. The exposed overlap edges of the wide breaker ply are then folded up over the narrow breaker ply along the edges of the narrow breaker ply.

BACKGROUND OF THE INVENTION

Heretofore ply turnups have been made by two bladders positioned at each edge such as those shown in U.S. Pat. No. 4,427,473. In U.S. Pat. No. 5,116,449, a single bladder at each edge has been used with an outboard turnover cage to provide the turnup. In each of these cases, the ply edges are carried by the bladders resulting in an uncertain condition of the ply edges after the turnup is completed.

A breaker forming apparatus without a bladder is also shown in U.S. Pat. No. 4,063,987 where a plurality of folding segments are movable radially and axially without a bladder to fold the edges of the wide breaker ply over the edges of the narrow breaker ply. This apparatus requires radially movable segments to hold the breaker material in place during the folding operation in the event the ply material sticks to the folding segments.

SUMMARY OF THE INVENTION

The present invention provides a drum having a plurality of circumferentially spaced apart turnup modules positioned at the edges of the drum. Each of the modules has a nose piece movable axially of the drum from an outer position having the same diameter as the diameter of the drum to an inner position overlapping one of the edges of the drum. A spring-loaded belt is wrapped around the nose piece and supports the wide breaker ply overlap edge when the wide breaker ply is applied. After the narrow breaker ply has been applied, each nose piece is moved to an inner position overlapping the drum edge and carries the wide breaker ply overlap edge over the edge of the narrow breaker, pressing the overlap edge against the narrow breaker ply. After turnup of the wide breaker ply overlap edge, the nose piece is moved axially outward and the belt is peeled off the breaker so as not to distort or stretch the material. The turnup modules are mounted on a plurality of drum segments spaced circumferentially around the drum and are retractable with the segments for removal of the folded breaker package.

In accordance with one aspect of the invention there is provided a method of building a folded breaker on a tire building drum having a plurality of drum folding modules at spaced apart edge positions circumferentially of the drum with each module having a belt with a first belt end fastened to the module and a second belt end fastened to an axially movable nose member comprising:

a. wrapping a wide breaker ply around the drum including the first belt end of each belt fastened to the module and splicing the leading edge and trailing edge together, b. wrapping a narrow breaker ply having a width less than the width of the wide breaker ply around the wide breaker ply exposing an overlap edge of the wide breaker ply at each edge of the wide breaker ply and splicing the leading edge and trailing edge of the narrow breaker ply, characterized by, c. folding each overlap edge of said wide beaker ply over each edge of the narrow breaker ply by moving the belt carrying each overlap edge over each edge of the narrow breaker ply by moving the nose member over each the edge of the narrow breaker ply.

In accordance with another aspect of the invention there is provided a tire building drum assembly for folding edges of a wide breaker ply over edges of a narrow breaker ply wrapped around the wide breaker ply comprising a plurality of circumferentially spaced drum segments characterized by a center module mounted on each of the drum segments, a folding module mounted on each of the segments at each end of the center module, each folding module having a nose piece movable axially of the drum from an axially outer position having the same diameter as the diameter of the center module to an axially inner position overlapping the center module, a folding belt wrapped around each nose piece with an axially inner end fastened to the center module and an axially outer end connected to a spring means on the nose piece for maintaining tension in the belt providing a support for an overlap edge of the wide breaker ply in the axially outer position of the nose piece and providing for sliding movement of the belt over the nose piece upon axial movement of the nose piece to the axially inner position for folding each overlap edge of the wide breaker ply over each edge of the narrow breaker ply.

DETAILED DESCRIPTION OF THE INVENTION

Figure 1:
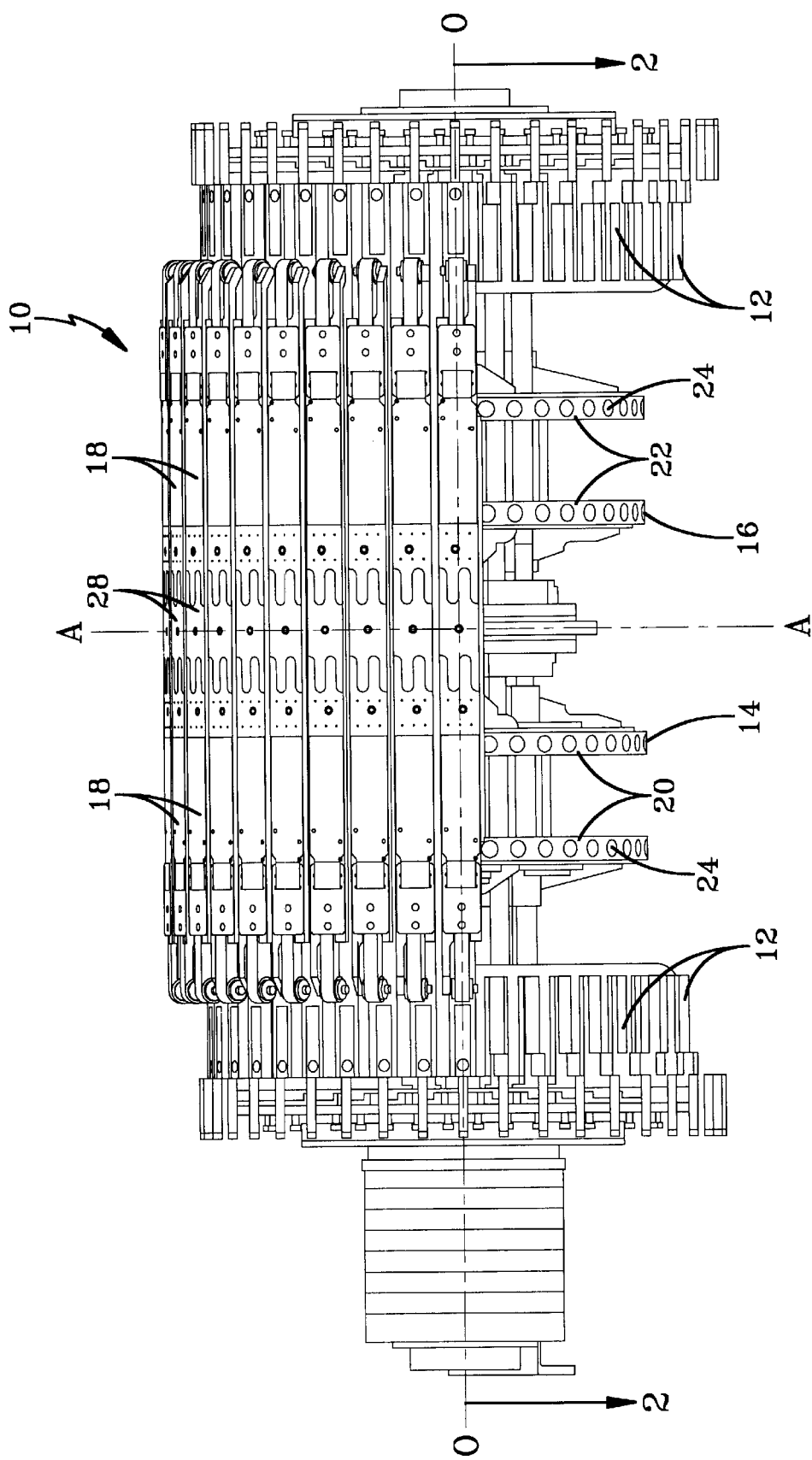
FIG. 1 is an elevation of a breaker folding drum embodying the invention with the lower center modules and folding modules broken away to show the hub assemblies.
Figure 2:
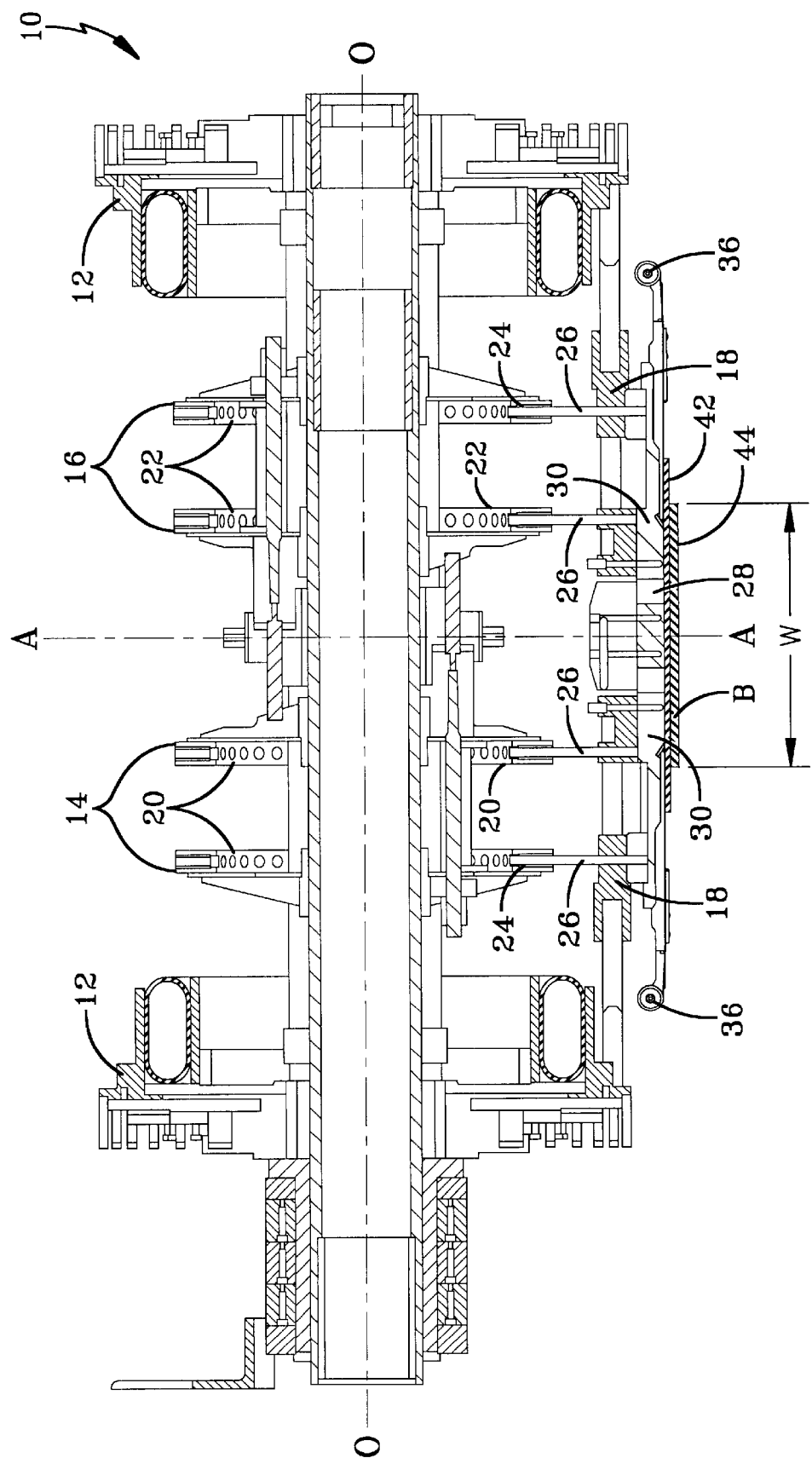
FIG. 2 is a sectional view of the drum and a folding module taken along the plane of line 2—2 in FIG. 1.

Referring to FIGS. 1 and 2, a breaker folding drum assembly 10 is shown having circumferentially spaced drum segments 12 arranged radially around the circumference of the drum. Two axially spaced hub assemblies 14 and 16 are positioned symmetrically about a lateral center line A—A of the drum assembly 10. A manually operated acme screw with symmetrical left and right hand threads (not shown) engages nuts mounted on the inner set of hub assemblies 14 and 16 so that as the screw is rotated the hub assemblies and attached folding modules 18 move symmetrically about the lateral center line A—A of the drum assembly 10.

Each of the hub assemblies 14 and 16 has circular hubs 20 and 22, with each hub of the assemblies 14,16 having a set of radially extending bushings 24. There is one bushing 24 for each of the drum segments 12. An inner shaft 26 is inserted into the corresponding bushing 24 of the inner circular hubs 20 and 22 and each of the shafts is attached to one of the folding modules 18. The hub assemblies 14 and 16 and shafts 26 provide the fold width setting for the drum segments 12. In the embodiment shown there are forty drum segments 12, however, this may be adjusted depending upon the size of the drum assembly 10 and the breaker package to be folded.

In addition to the drum segments 12, center modules 28 are mounted on the inner shafts 26 and interlock with the folding modules 18 at each end of the drum assembly 10. The center modules 28 are replaceable and the folding modules 18 can be adjusted for the desired folding width W shown in FIG. 2. Holes (not shown) may be provided in the center modules 28 and folding modules 18 in communication with the source of vacuum to help hold the breaker stock B on the drum segments 12.

Figure 3:
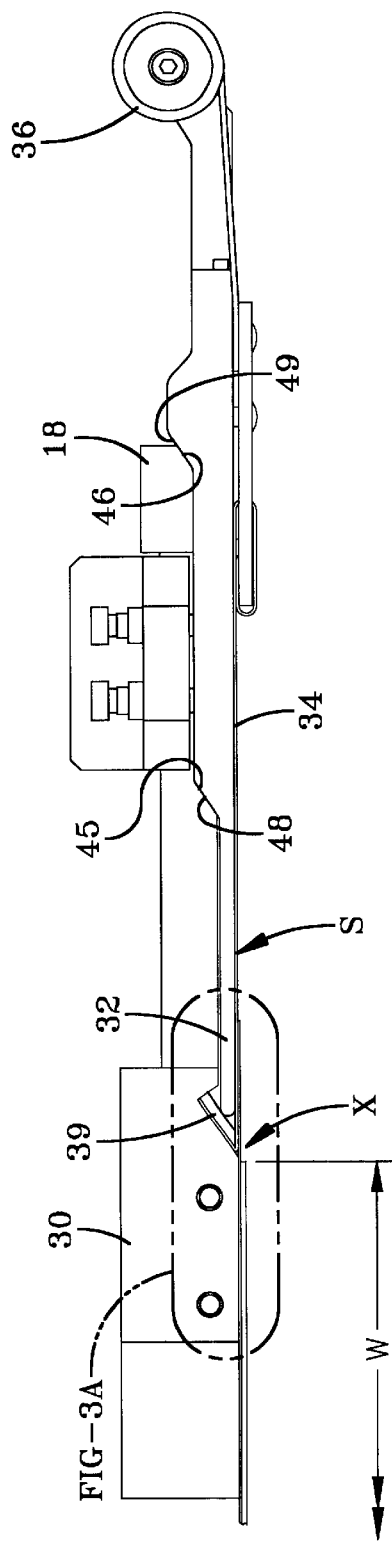
FIG. 3 is an enlarged view of one of the folding modules in the retracted condition.
Figure 3A:
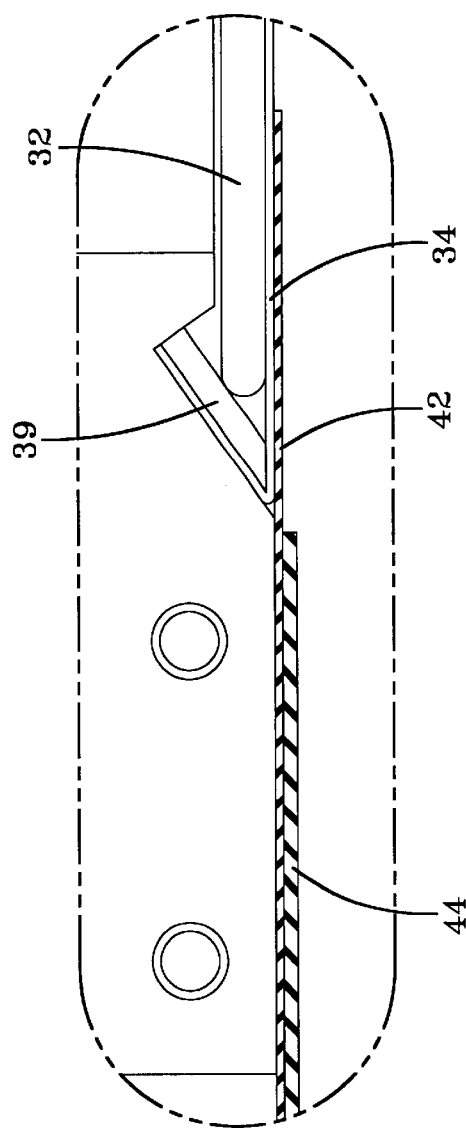
Figure 4:
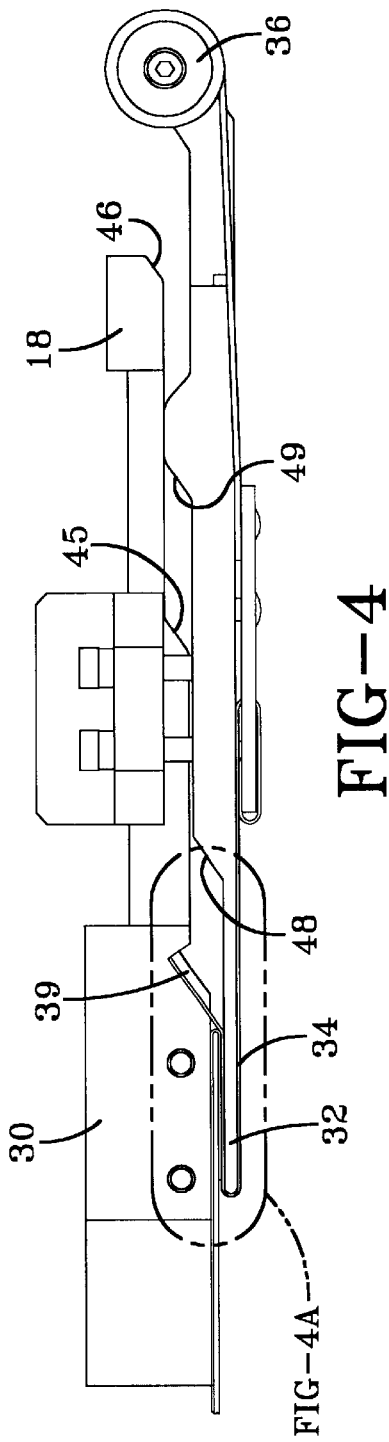
FIG. 4 is a view like FIG. 3 with one of the folding modules in the folding position.
Figure 4A:
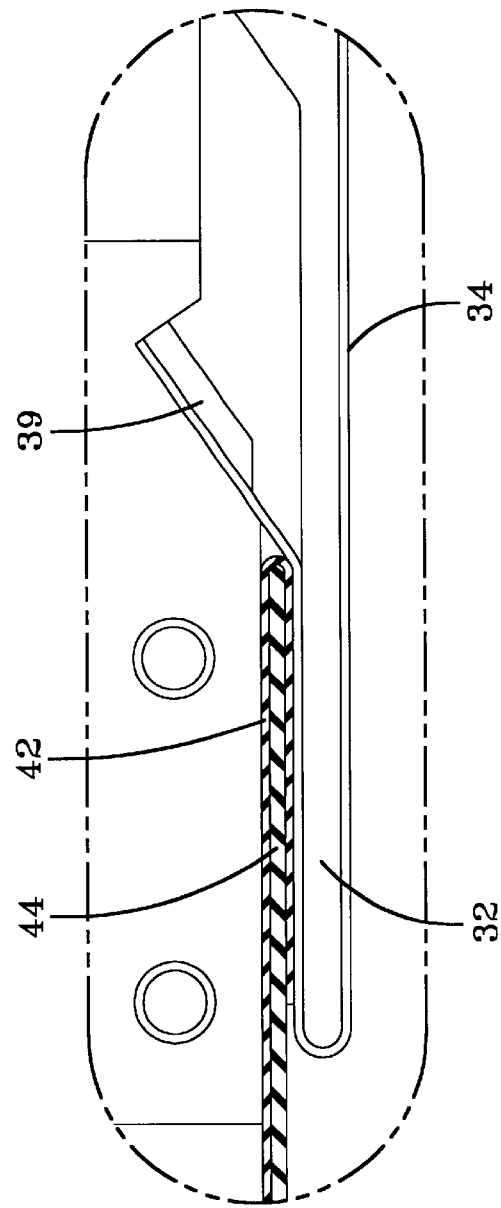

Referring to FIGS. 3 and 4, each folding module 18 includes a base piece 30, a relatively thin nose piece 32, a belt member 34 and a spring assembly 36 attached to the belt member at one end and mounted on the nose piece. The other end of the belt member 34 is attached to the base piece 30 by a bracket 39. The belt member 34 is wrapped around the leading end of the nose piece 32 and lays flat across the top surface of the nose piece. In the retracted position shown in FIG. 3, the folding module 18 presents a flat horizontal surface S. Part of this surface S consists of the radially outer surface of the base piece 30, and the other part consists of the belt member 34 disposed on top of the nose piece 32 as shown in FIG. 3. The line of contact X where the belt member 34 is attached to the base piece 30 by bracket 39 is where the folding will occur.

Diameter adjustment may be provided by linear bearings for each end of each drum segment 12. Bearing blocks of the linear rails are attached radially on a common disk. The linear rails move radially within the bearing blocks to provide diameter adjustment. The drum segments 12 are attached to brackets on the linear rails so that each of the drum segments is supported by one linear rail at each end. Inflatable bladders (not shown) may be provided to move all of the segments diametrically outward when air pressure is applied The limit of travel is provided by a control ring which contacts the blocks mounted on the linear rails. This determines a specific working diameter of the drum assembly 10. The control rings are replaceable for different building diameters. Other methods of diameter adjustment may be provided, such as using a rotating disk with a spiral slot wherein elements on the linear rails engage the spiral slot and the drum diameter maybe adjusted by rotating the disk.

In operation the drum assembly 10 is adjusted to the desired folding width W and expanded to the building diameter. The wide breaker ply 42 is wrapped around the breaker folding drum assembly 10 and spliced. Next, a narrow breaker ply 44 is wrapped around the wide breaker ply 42 and spliced. Internal air motors may be actuated causing the outer hubs 24 to move in towards the center line A—A of the drum assembly 10. The hubs 24 move each nose piece 32 towards the center line A—A of the drum assembly 10. The hubs 24 carry the nose pieces 32 on the folding modules 18 towards the center line A—A of the drum assembly 10 by movement of the connecting shafts 26. Beveled surfaces 45 and 46 on the base piece 30 contact corresponding beveled surfaces 48 and 49 on the nose piece 32 as the nose piece moves axially inward and to maintain the nose piece surface at an equal distance from the axis O—O of the drum assembly 10. This minimizes stretching of the plies during the folding process. The belt members 34 which are wrapped around the nose piece move axially inwards and over the base piece causing the overlap edges of the wide breaker ply 42 to begin folding over the narrow breaker ply 44. During this movement there is no relative motion between the belt member 34 and the wide breaker 42 since all of the sliding action takes place between the nose piece 32 and the belt member 34. When the nose piece 32 completes the axially inward motion to the position shown in FIG. 4, the fold is completed. The direction of the air motors is then reversed wherein the outer hub assembly 16 moves axially outward and carries the folding modules 18 to the original positions shown in FIG. 3. During this movement each belt member 34 is peeled off each folded wide breaker ply 42 and returned to the position shown in FIG. 3.

Subsequent tire building operations may then be performed on the drum assembly 10, after which the drum assembly may be collapsed allowing the breaker tread package to be removed from the drum assembly.

While a certain representative embodiment and details have been shown for the purpose of illustrating the invention, it will be apparent to those skilled in the art that various changes and modification may be made therein without departing from the scope of the invention.

Having thus described the invention, it is now claimed:

1. A tire building drum assembly for folding edges of a wide breaker ply over edges of a narrow breaker ply wrapped around said wide breaker ply comprising a plurality of circumferentially spaced drum segments characterized by a center module mounted on each of said drum segments, a folding module mounted on each of said segments at each end of said center module, each said folding module having a nose piece movable axially of said drum from an axially outer position having the same diameter as the diameter of said center module to an axially inner position overlapping said center module, a folding belt wrapped around each said nose piece with an axially inner end fastened to said center module and an axially outer end connected to a spring means on said nose piece for maintaining tension in said belt providing a support for an overlap edge of said wide breaker ply in the axially outer position of said nose piece and providing for sliding movement of said belt over said nose piece upon said axial movement of said nose piece to said axially inner position for folding each said overlap edge of said wide breaker ply over each said edge of said narrow breaker ply.

2. A building drum according to claim 1 further characterized by folding module activating means connected to said folding modules for providing axial movement of each said nose piece between said axially outer position and said axially inner position.

3. The building drum assembly according to claim 2 further characterized by said activating means comprising an axially movable hub connected to each said nose piece and movable axially for folding over said edges by said nose piece.

4. The building drum assembly according to claim 3 further characterized by beveled surfaces on each said nose piece and on said center module for providing expansion of each said nose piece during folding of each said overlap edge.

* * * * *